(12) United States Patent
Zander

(10) Patent No.: US 6,186,679 B1
(45) Date of Patent: Feb. 13, 2001

(54) FILM SUPPORT AND CIRCUIT BOARD ASSEMBLAGE FOR CAMERA

(75) Inventor: Dennis R. Zander, Penfield, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/542,550

(22) Filed: Apr. 3, 2000

(51) Int. Cl.[7] .......................... G03B 17/00; G03B 17/02
(52) U.S. Cl. .......................... 396/440; 396/535; 396/542
(58) Field of Search .................... 396/439, 440, 396/442, 535, 536, 542

(56) References Cited

U.S. PATENT DOCUMENTS

| 5,097,278 | 3/1992 | Tamamura et al. | 396/320 |
|---|---|---|---|
| 5,669,026 | * 9/1997 | Tanaka | 396/440 |
| 5,784,660 | 7/1998 | Tanaka | 396/440 |
| 5,842,071 | 11/1998 | Stanchus et al. | 396/440 |
| 5,848,311 | 12/1998 | Satake et al. | 396/440 |
| 5,897,234 | * 4/1999 | Tanaka | 396/440 |

* cited by examiner

*Primary Examiner*—Eddie C. Lee
(74) *Attorney, Agent, or Firm*—Roger A. Fields

(57) ABSTRACT

A film support and circuit board assemblage for a camera includes a film support which has a group of film supporting projections that each project an identical height from a film facing side of the film support, and a circuit board which has a raised part. The film support has a film supporting projection that projects from the film facing side the same height as the group of film supporting projections and that is hollow to form an open cavity in an opposite side of the film support. The circuit board is arranged next to the opposite side of the film support, with the raised part protruding into the cavity to make the camera compact.

8 Claims, 3 Drawing Sheets

FILM SUPPORT AND CIRCUIT BOARD ASSEMBLAGE FOR CAMERA

FIELD OF THE INVENTION

The invention relates generally to the field of photography, and in particular to cameras. More specifically, the invention relates to a film support and circuit board assemblage for a camera

BACKGROUND OF THE INVENTION

It is well known for a camera to include an interior film support which has a group of film supporting projections that each project an identical height from a film facing side of the film support. The film supporting is intended to ensure the correct film shape during exposure at a backframe opening in the camera, and can be integrally formed with a rear cover part of the camera or alternatively can be a separate piece beneath the rear cover part. The film supporting projections either take the form of several parallel ribs as in U.S. Pat. No. 5,842,071 issued Nov. 24, 1998 or a group of hemisphere-shaped small projections as in U.S. Pat. No. 5,848,311 issued Dec. 8, 1998.

It is equally known for a camera to include an interior circuit board. The circuit board may have one or more raised parts that often tend to increase the thickness of the camera, particularly when the circuit board is in the vicinity of the film support.

If a goal is to make the camera as compact as reasonably possible, the circuit board because of its raised part(s) and the film support because of its film supporting projections are impediments to achieving this goal.

SUMMARY OF THE INVENTION

A film support and circuit board assemblage for a camera comprising a film support which has a group of film supporting projections that each project an identical height from a film facing side of the film support, and a circuit board which has a raised part, is characterized in that:

the film support has a film supporting projection that projects from the film facing side the same height as the group of film supporting projections and that is hollow to form an open cavity in an opposite side of the film support; and the circuit board is arranged next to the opposite side of the film support, with the raised part protruding into the cavity. This design facilitates the goal of making the camera as compact as reasonably possible.

DETAILED DESCRIPTION OF THE INVENTION

The invention is disclosed as being embodied preferably in a motorized film-advance camera. Because the features of a motorized film-advance camera are generally known, the description which follows is directed in particular only to those elements forming part of or cooperating directly with the disclosed embodiment. It is to be understood, however, that other elements may take various forms known to a person of ordinary skill in the art.

Figure 1:
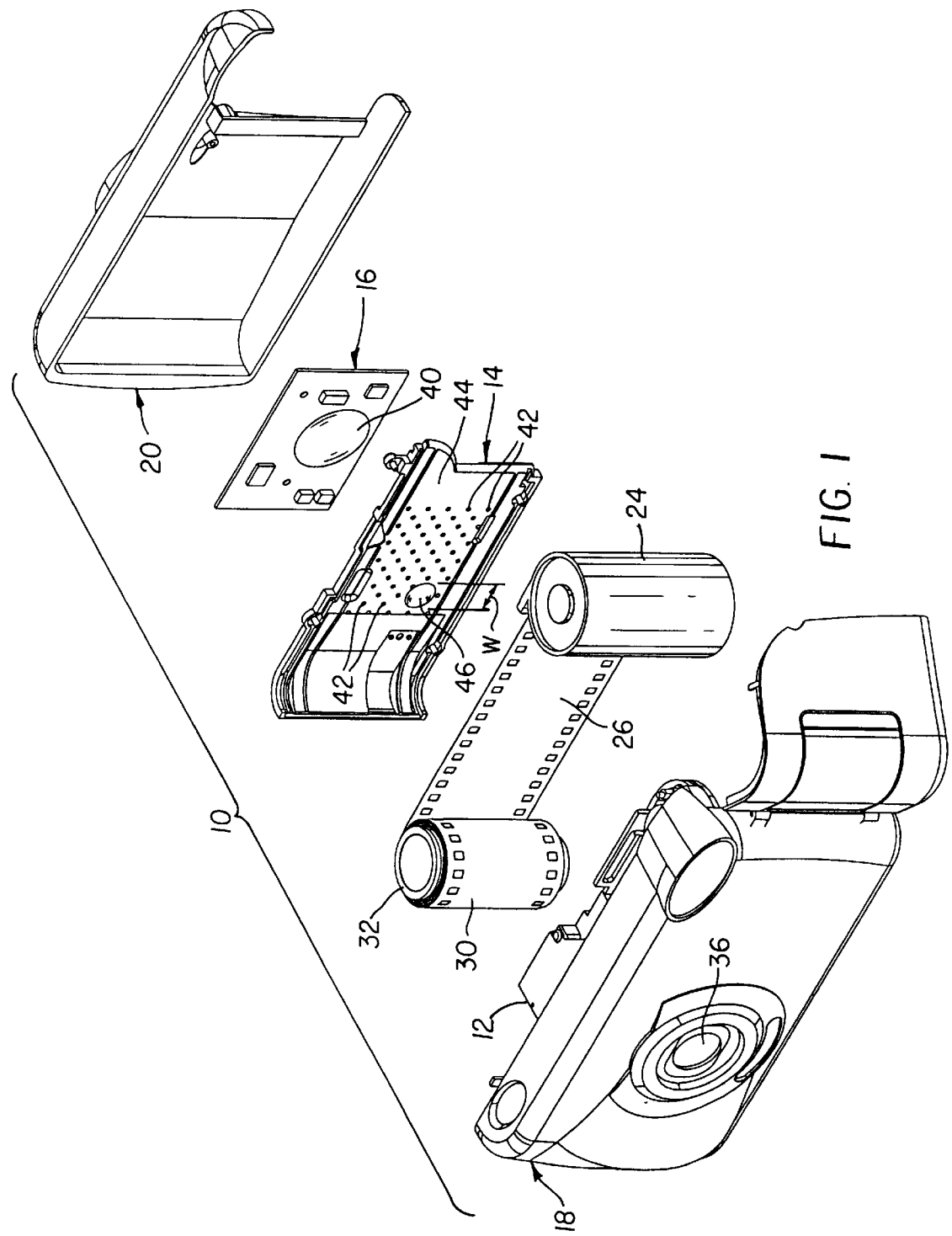
FIG. 1 is a front exploded view of a camera including a film support and circuit board assemblage, according to a preferred embodiment of the invention.
Figure 2:
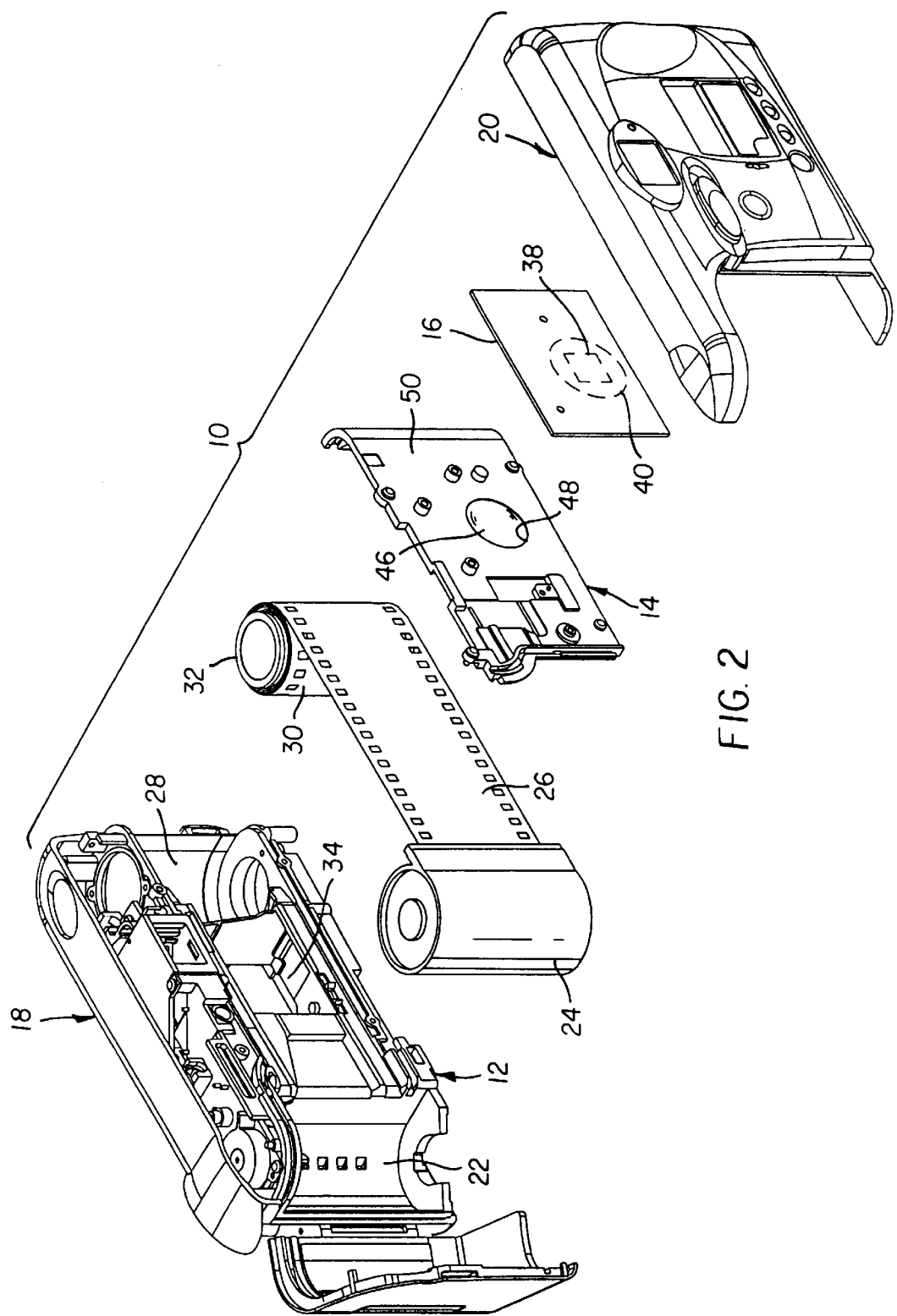
FIG. 2 is a rear exploded view of the camera.

Referring now to the drawings, FIGS. 1 and 2 show a motorized film-advance camera 10 including a plastic opaque main body part 12, a plastic opaque film support 14, a circuit board 16, a plastic opaque front cover part 18, and a plastic opaque rear cover part 20. The front cover part 18 and the rear cover part 20 house the main body part 12, the film support 14 and the circuit board 16 between them.

As is typical, the main body part 12 has a rearwardly open cartridge receiving chamber 22 for a conventional film cartridge 24 that comes with an unexposed filmstrip 26, a rearwardly open film take-up chamber 28 for an exposed film roll 30 that is wound onto a film take-up spool 32 rotatably supported in the film take-up chamber, and a rearwardly open backframe opening 34 located between the cartridge receiving chamber and the film take-up chamber for exposing successive frames of the filmstrip when a shutter (not shown) is momentarily opened to allow ambient light to be received through a front taking lens 36 on the main body part. After each exposure, the film take-up spool 32 is motor-rotated to wind an exposed frame of the filmstrip 26 onto the exposed film roll 30 and to advance a fresh unexposed frame from the film cartridge 24 to between the backframe opening 34 and the film support 14.

Figure 3:
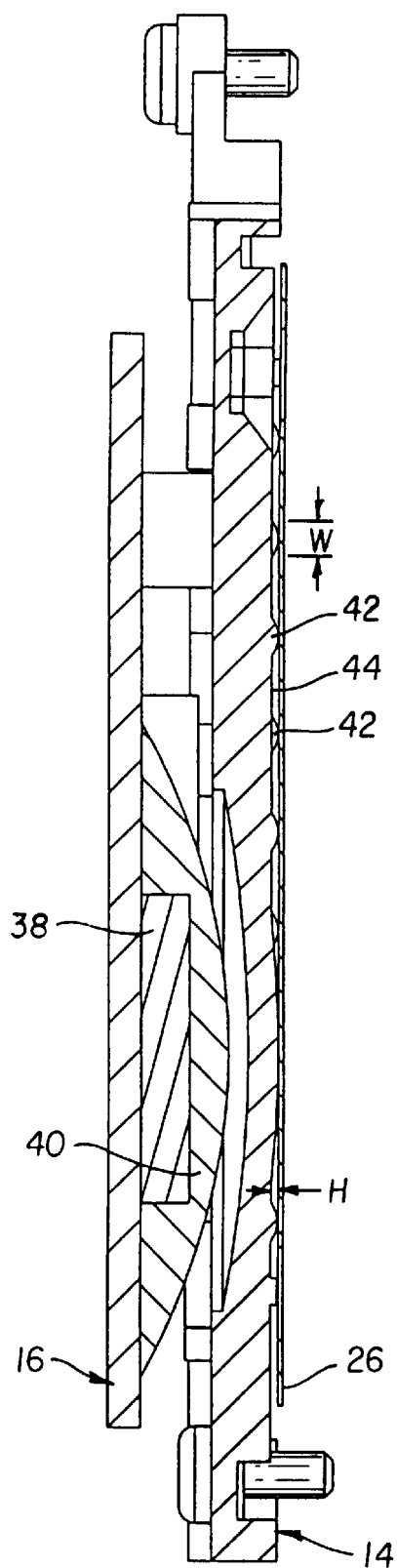
FIG. 3 is a sectional view of the film support and circuit board assemblage.

As shown in FIG. 3, the circuit board 16 has an electrical component 38, such as a known microprocessor, that is raised from (projects from) the circuit board. A hemisphere-shaped protective cover dome 40 is affixed to the circuit board 16 over the electrical component 38 to completely cover (seal) the electrical component.

The film support 14 has a group of identical, solid, relatively small, hemisphere-shaped film supporting projections 42 that each project from a film facing side 44 of the film support an identical height H and a single, hollow, relatively large, hemisphere-shaped film supporting projection 46 that projects from the film facing side the same height as the film supporting projections. See FIGS. 1 and 3. Since the film supporting projection 46 is hollow, it forms an open cavity 48 that is open at an opposite side 50 of the film support 14. The film supporting projection 46 has a width W that is greater than respective widths W of the group of film supporting projections 42 to make the cavity 48 larger than any one of the film supporting projections in the group.

To assemble the film support 14 and the circuit board 16 together as shown in FIG. 3, the circuit board is placed next to the opposite side 50 of the film support, and simultaneously the cover dome 40 is inserted in the cavity 48.

The invention has been described with reference to a preferred embodiment. However, it will be appreciated that variations and modifications can be effected by a person of ordinary skill in the art without departing from the scope of the invention.

PARTS LIST 10. camera
12. main body part
14. film support
16. circuit board
18. front cover part
20. rear cover part
22. cartridge receiving chamber
24. film cartridge
26. filmstrip 28. flim take-up chamber
30. exposed film roll
32. film take-up spool
34. backframe opening
36. taking lens
38. electrical component
40. cover dome
42. small film supporting projections
44. film facing side
H. height
46. large film supporting projection
48. cavity
50. opposite side
W. width

What is claimed is:

1. A film support and circuit board assemblage for a camera comprising a film support which has a group of film supporting projections that each project an identical height from a film facing side of said film support, and a circuit board which has a raised part, is characterized in that:

said film support has a film supporting projection that projects from said film facing side the same height as said group of film supporting projections and that is hollow to form an open cavity in an opposite side of said film support; and said circuit board is arranged next to said opposite side of said film support, with said raised part protruding into said cavity.

2. A film support and circuit board assemblage as recited in claim 1, wherein said film supporting projection that is hollow has a width that is greater than respective widths of said group of film supporting projections.

3. A film support and circuit board assemblage as recited in claim 2, wherein said group of film supporting projections are solid.

4. A film support and circuit board assemblage as recited in claim 1, wherein said circuit board has an electrical component and said raised part is a cover dome which covers said electrical component.

5. A film support for a camera comprising a film facing side and an opposite side, and a group of film supporting projections that each project an identical height from said film facing side, is characterized in that:

a film supporting projection projects from said film facing side the same height as said group of film supporting projections and is hollow to form an open cavity in an opposite side of said film support in order to receive a raised part of a circuit board when the circuit board is arranged next to said opposite side of said film support.

6. A film support and circuit board assemblage as recited in claim 5, wherein said film supporting projection that is hollow has a width that is greater than respective widths of said group of film supporting projections to make said cavity larger than any one of said film supporting projections in said group.

7. A camera comprising a main body part which has a backframe opening for film exposure, a film support which has a group of film supporting projections that each project an identical height from a film facing side of said film support, and a circuit board which has a raised part, is characterized in that:

said film support has a film supporting projection that projects from said film facing side the same height as said group of film supporting projections and that is hollow to form an open cavity in an opposite side of said film support; and said circuit board is arranged next to said opposite side of said film support, with said raised part protruding into said cavity to make said camera compact.

8. A method of assembling a film support which has a group of film supporting projections that each project an identical height from a film facing side of the film support and which has a film supporting projection that projects from the film facing side the same height as the group of film supporting projections and that is hollow to form an open cavity in an opposite side of the film support, and a circuit board which has a raised part, said method comprises the steps of:

arranging the circuit board next to the opposite side of the film support, and simultaneously inserting the raised part into the cavity.

* * * * *